(12) United States Patent
Huang

(10) Patent No.: US 12,259,895 B1
(45) Date of Patent: Mar. 25, 2025

(54) BEHAVIOR-DRIVEN QUERY SIMILARITY PREDICTION BASED ON LANGUAGE MODEL FOR DATABASE SEARCH

(71) Applicant: Amazon Technologies, Inc., Seattle, WA (US)

(72) Inventor: Yupin Huang, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 18/338,124

(22) Filed: Jun. 20, 2023

(51) Int. Cl.
  *G06F 16/2457* (2019.01)
  *G06F 16/2455* (2019.01)

(52) U.S. Cl.
  CPC .. *G06F 16/24578* (2019.01); *G06F 16/24553* (2019.01)

(58) Field of Classification Search
  CPC .............. G06F 16/24578; G06F 16/24553
  See application file for complete search history.

(56) References Cited

U.S. PATENT DOCUMENTS

| | | | |
|---|---|---|---|
| 11,210,341 B1 * | 12/2021 | Bhagat | G06F 16/90335 |
| 11,762,928 B2 * | 9/2023 | Kofler | G06F 16/9532 |
| | | | 707/722 |
| 2021/0342684 A1 * | 11/2021 | Shraga | G06N 3/045 |
| 2022/0107799 A1 * | 4/2022 | Wu | G06N 20/00 |
| 2024/0152512 A1 * | 5/2024 | Decker | G06F 16/2453 |
| 2024/0168984 A1 * | 5/2024 | Kim | G06F 16/35 |

* cited by examiner

*Primary Examiner* — Huawen A Peng
(74) *Attorney, Agent, or Firm* — Knobbe, Martens, Olson & Bear, LLP

(57) ABSTRACT

An improved search system can address sparse behavioral signals. Machine learning is used to determine queries with historical data that are similar to an input query, which have limited behavioral signals. Co-acquisitions of items for query pairs are used to generate a similarity value for the pairs, which are used as labels during training of machine learning models. Multiple machine learning models are used during inference such that a subset of similar queries is determined with a less computationally expensive model and a more computationally expensive model is used to re-rank the subset of queries. Accordingly, for input queries with limited behavioral data, the search system identifies similar queries with behavioral data and their corresponding search results can be presented to a user.

20 Claims, 7 Drawing Sheets

| Input Query | Candidate Query | Intersection | Union | Minimum | Jaccard Similarity | Overlap Similarity | Value |
|---|---|---|---|---|---|---|---|
| goya lady fingers | lady fingers for tiramisu | 9 | 42 | 12 | 0.214 | 0.75 | 0.161 |
| goya lady fingers | lady finger cookies for tiramisu | 8 | 34 | 12 | 0.235 | 0.67 | 0.157 |
| goya lady fingers | ladyfinger cookies | 8 | 58 | 12 | 0.138 | 0.67 | 0.092 |
| goya lady fingers | sponge fingers biscuit | 4 | 18 | 10 | 0.222 | 0.4 | 0.088 |
| goya lady fingers | lady fingers for trifle | 4 | 18 | 10 | 0.222 | 0.4 | 0.088 |

*FIG. 4B*

BEHAVIOR-DRIVEN QUERY SIMILARITY PREDICTION BASED ON LANGUAGE MODEL FOR DATABASE SEARCH

BACKGROUND

In a database context, ranking can be an integral part of information retrieval. Machine learning techniques can be used to create ranking models for search systems, which can be referred to as learning to rank or machine-learned ranking. Learning-to-rank models can rely on several features to rank search results. The features can be based on users' interactions with items, which can be referred to as behavioral features. However, in some cases, for the vast majority of unique queries, user signals may be too sparse to generate useful features for effective ranking. The training data can include items, queries, search results, and historical data, such as previous users' interactions that can indicate user engagement with the results of a query. The training data can be used by a machine learning algorithm to produce a ranking model that computes the relevance of search results. A user can enter a search query, the ranking model can be applied to some items to determine the ranking of items, and the results can be presented based on the ranking.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

FIGS. 4A-4B depict a methodology for generating training data that includes query pairs and similarity scores.

DETAILED DESCRIPTION

Figure 1:
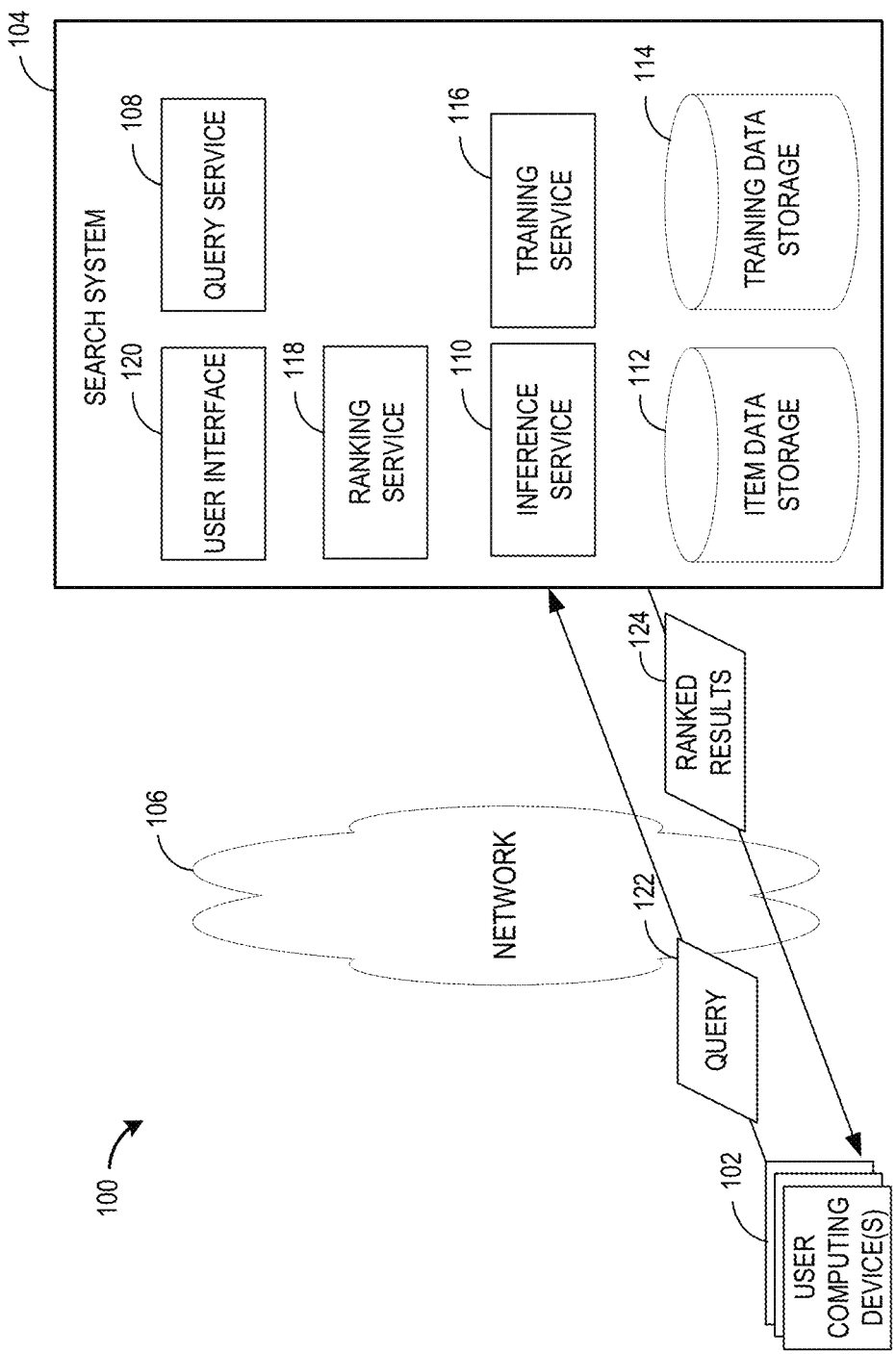
FIG. 1 is a schematic block diagram depicting an illustrative network environment for implementing a search system.

As described above, existing search systems can use learning-to-rank based ranking models. The existing systems can use training data in a machine learning algorithm to produce a ranking model that predicts the relevance of search results. Behavior features constructed based on user feedback towards queries can be important features in ranking models. However, user feedback signals can be sparse. For example, while an electronic catalog system can receive billions of queries every year, only a small fraction of those queries may have sufficient user behavioral signals to build behavior features useful for effective ranking. Many queries may be semantically similar to other queries. However, the corresponding signals for those queries may differ significantly, which can result in unbalanced feature quality for ranking.

Generally described, aspects of the present disclosure are directed to improved search systems and methods that can address sparse behavioral signals. Machine learning can be used to determine queries with historical data that are similar to an input query, which have limited behavioral signals. The machine learning techniques described herein can identify similar queries that would be lexically difficult to determine. In particular, co-acquisitions of items for query pairs can be used to generate a similarity value for the pairs, which can be used as labels during training of machine learning models (which can include a large language model). The systems and methods described herein can advantageously use large language models to capture semantic similarity in language. Moreover, multiple machine learning models can be used during inference such that a subset of similar queries can be determined with a less computationally expensive model and a more computationally expensive model can be used to re-rank the subset of queries. Accordingly, for input queries with limited behavioral data, a system can identify similar queries with behavioral data and their corresponding search results can be presented to a user. The systems and methods described herein can extract similar query behavioral scores into priors used for item search ranking models.

The systems and methods described herein may improve computer performance. As described herein, given 100 million input queries, 100 million historical candidate queries, a cross-encoder/interaction-based model could be called 100M$^2$, which could take 100 million GPU days. With a 10× inference speed and 1,000 GPUs, the predictions could take 10,000 days to finish. When search logs have billions of unique query search result pairs, using a cartesian product directly on all the queries would yield over a trillion query pairs, which can result in out-of-memory issues. Accordingly, given a large set of queries, there can be billions or trillions of query combinations to process, which can pose hardware challenges on data storage, memory (such as out-of-memory issues), and processor executions. Some of the solutions described herein can use faster representation-based model(s) for initial filtering and interaction-based model(s) for re-ranking, which can improve the operation of a computer by allowing the computer processor(s) to make faster predictions. Some of the solutions described herein can employ divide-and-conquer strategies to address the scalability challenges of processing large sets of queries. Therefore, the systems and methods described herein can improve the operation of a computer by efficiently processing large sets of queries in a manner that is scalable for data storage, memory, and processor purposes.

As used herein, the term "interaction-based model" can refer to machine learning models that treat a text pair as a single sequence and encode it through a cross encoder. An interaction-based model can include or be a cross-encoder model. As used herein, the term "representation-based model" can refer to machine learning models that encode a text pair independently. A representation-based model can include or be a bi-encoder model. Machine learning models, such as interaction-based and representation-based models can generate embeddings. As used herein, an "embedding" can refer to a low dimensional vector representation of data, such as, but not limited to, words. An embedding can capture some of the semantics of the input by placing semantically similar inputs closer together in the embedding space. An embedding can be learned and/or reused across models.

As used herein, the term "search result" can refer to an item that is provided in response to a query. An item can refer to a data object that can represent a specific thing that has a number of definable attributes. For example, an item can represent things such as, but not limited to, a physical product, a digital product, and/or an electronic document. The term "item" is used interchangeably to refer to an item itself (e.g., a particular product or particular digital content) and to its description or representation in a computer system or electronic catalog. As will be apparent from the context in which it is used, the term is also sometimes used herein to refer only to the item itself or only to its representation in the computer system. Example items can be music albums, audiobooks, books, movies, television shows, and/or other media products in either an electronic format or physical format. Example items can also be electronic or digital, such as an electronic service or any electronic content provided by a buyer to a seller in which a physical good is not transferred. Users can interact with items. For example, a user can select an item in a user interface to view details about the item. A user can acquire an item. Acquiring an item can refer to consuming an item, such as by watching a movie or listening to a music album.

In the search context, behavioral features can be useful for relevance estimation. Using behavioral features in a learning-to-rank system can be effective because of their ability to encode user behavior. However, behavioral features can take a relatively long time to learn (need many impressions to attain high values) and unlearn (until some other items receive higher values). This phenomenon can adversely affect some items because they have minimal behavioral data. In some existing systems, it takes time for new items to gather enough historical signals to gain higher positions in the ranking. In some existing systems, items, including the highly engaging ones, tend to take a fair amount of time before steadily reaching their highest-ranking position. Amplitude and steepness of ranking climb vary depending on the number of impressions (such as acquisitions and/or user selections) received by an item. Some existing systems can practice tokenization, filtering, and stemming to perform query normalization, which can lead to poorly rewritten queries. Some existing systems can also re-write queries, which can lead to poorly rewritten queries.

The systems and methods described herein may improve information and/or database retrieval technology. The solutions described herein may address the technical deficiencies of learning-to-rank algorithms with respect to the cold-start issues described herein. Machine learning algorithms can be used to identify queries with behavioral data that are similar to an input query and provide search results related to the queries with behavioral data. This approach can advantageously break the zero-feedback loop of existing learning-to-rank models for items that fail to generate user interaction data. The technical solutions described herein can obviate the need for administrators to manually set prediction values that can be a time-consuming, error prone, arbitrary, and/or inefficient process. Moreover, the technical solutions described herein can overcome deficiencies with respect to query normalization and/or query re-writing. Rather, the machine learning and prediction algorithms described herein can enable items with limited behavioral data to be efficiently and/or programmatically ranked, which did not occur in some existing systems. Thus, the systems and methods described herein can improve traditional information retrieval techniques.

Turning to FIG. 1, an illustrative network environment 100 is shown in which a search system 104 may rank items with minimal behavioral data. The network environment 100 may include one or more user computing devices 102 and the search system 104. The search system 104 may include a user interface 120, a query service 108, a ranking service 118, a training service 116, an inference service 110, an item data storage 112, and a training data storage 114. The constituents of the network environment 100 may be in communication with each other either locally or over a network 106. While certain constituents of the network environment 100 are depicted as being in communication with one another, any constituent of the network environment 100 can communicate with any other constituent of the network environment 100; however, not all of these communication lines are depicted in FIG. 1. For example, any of the user interface 120, the query service 108, the ranking service 118, the training service 116, and the inference service 110 can communicate directly with each other.

User computing devices 102 can include, but are not limited to, a laptop or tablet computer, personal computer, personal digital assistant (PDA), hybrid PDA/mobile phone, smart wearable device (such as a smart watch), mobile phone, and/or a smartphone. A user can submit, via the user computing device 102, a query 122 to the search system 104, such as by using the user interface 120. The query service 108 can retrieve search results from the item data storage 112. In some embodiments, if there are input queries with insufficient behavioral signals, the inference service 110 can predict similar queries with better behavioral signals and the initial search results can be augmented with the search results for the similar queries. The ranking service 118 can rank the search results using a ranking model and features that incorporate the behavioral signals from similar queries. The ranked search results 124 can then be presented on the user interface 120. Users, via the user computing device 102, can further interact with items via the user interface 120 as described herein. While not illustrated in FIG. 1, in some embodiments, the user interface 120 may be executed client-side at the user computing device 102. For example, an application can execute on the user computing device 102 that presents the user interface 120. As described herein, the training service 116 can train multiple machine learning models based on data from the training data storage 114 that are used by the inference service 110.

In some embodiments, the item data storage 112 can be included in and/or interface with an electronic catalog system. The electronic catalog system may include or be in communication with a data store of information about items that may be listed for sale, lease, etc. by an electronic marketplace, sellers, merchants and/or other users. The item information in this data store may be viewable by end users through a browsable or searchable electronic catalog in which each item may be described in association with a network page, such as an item detail page, describing the item. Each item detail page may include, for example, an item image and description, customer ratings, customer and professional reviews, sales rank data, lists of related items, and/or other types of supplemental data that may assist consumers in making informed acquisition decisions. A network page can be provided that enables users to interact with items, such as selecting, acquiring, or consuming items (such as watching or playing a media content item). Users of the system may, in some embodiments, locate specific item detail pages within the electronic catalog by executing search queries, navigating a browse tree, and/or using various other navigation techniques.

The item data storage 112 and/or the training data storage 114 may be embodied in hard disk drives, solid state memories, or any other type of non-transitory computer readable storage medium. The item data storage 112 and/or the training data storage 114 may also be distributed or partitioned across multiple local and/or remote storage devices. The item data storage 112 and/or the training data storage 114 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

The user computing devices 102 and/or the search system 104 may each be embodied in a plurality of devices. Each of the user computing devices 102 and/or the search system 104 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program (a.k.a., computer-executable) instructions that the hardware processor executes in order to operate the user computing devices 102 and/or the search system 104. The memory generally includes RAM, ROM, and/or other persistent and/or auxiliary non-transitory computer readable storage media.

Additionally, in some embodiments, the search system 104 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
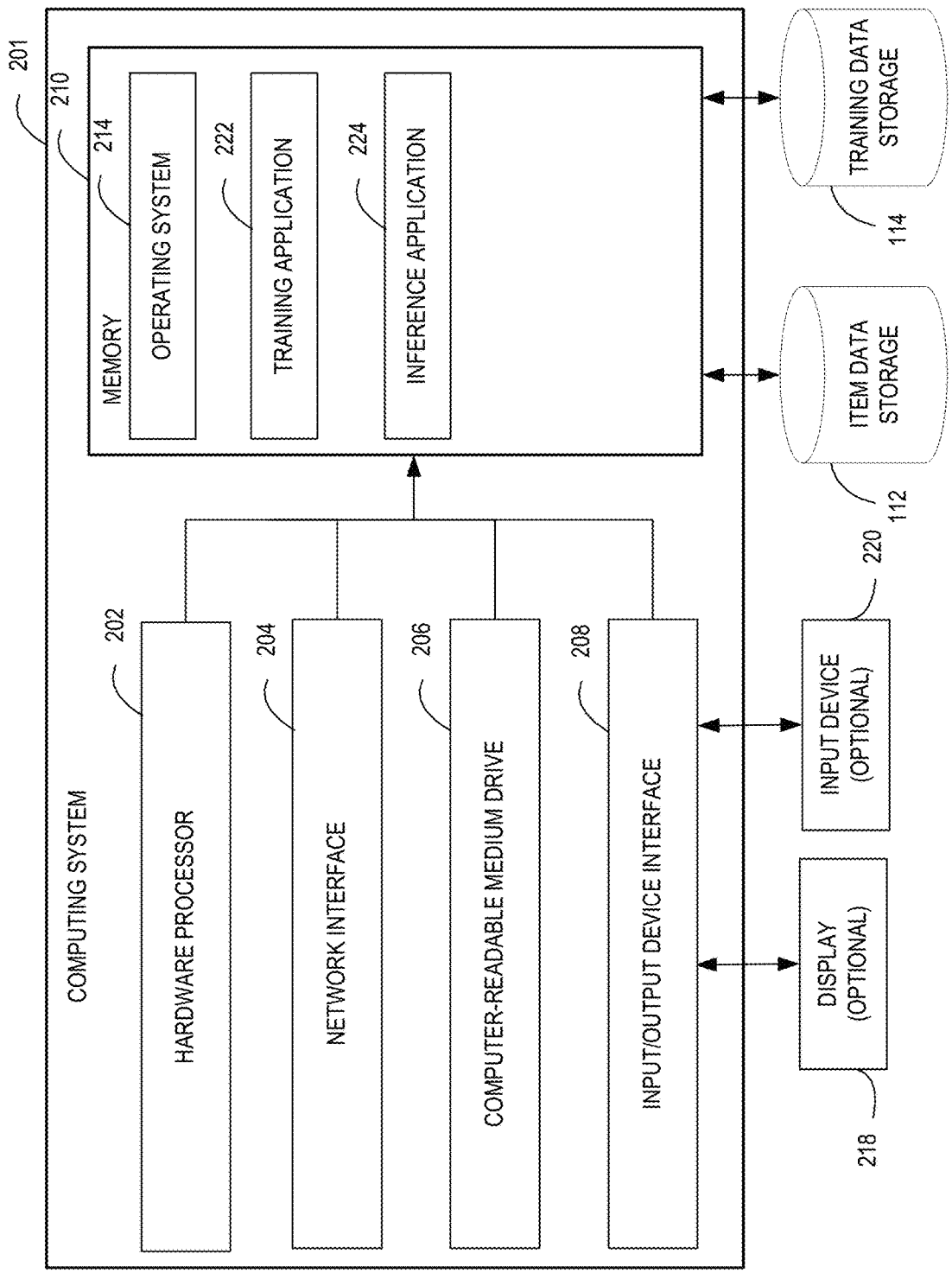
FIG. 2 is a schematic block diagram depicting an illustrative general architecture of a computing system for implementing the search system referenced in the network environment depicted in FIG. 1.

FIG. 2 is a schematic diagram of an illustrative general architecture of a computing system 201 for implementing a computing device within the search system 104 referenced in the environment 100 in FIG. 1. The computing system 201 includes an arrangement of computer hardware and software components that may be used to execute the training application 222 and/or the inference application 224. The general architecture of FIG. 2 can be used to implement other devices described herein, such as the user computing device 102 referenced in FIG. 1. The computing system 201 may include more (or fewer) components than those shown in FIG. 2. Further, other computing systems described herein may include similar implementation arrangements of computer hardware and/or software components.

The computing system 201 for implementing a device within the search system 104 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the search system 104. The memory 210 generally includes RAM, ROM and/or other persistent or non-transitory computer-readable storage media. The memory 210 may store an operating system 214 that provides computer program instructions for use by the hardware processor 202 in the general administration and operation of the device within the search system 104.

The memory 210 may include a training application 222 and/or an inference application 224 that may be executed by the hardware processor 202. In some embodiments, the training application 222 and/or the inference application 224 may implement various aspects of the present disclosure. In some embodiments, item-related data (such as behavioral data) can be processed; the training application 222 can train and/or retrain machine learning model(s); and the inference application 224 can identify queries similar to an input query.

As described herein, labels can be used to train machine learning models to predict query similarity. For an input query, $q_i$, and a candidate query, $c_{ij}$, similarity can be denoted as $y_{ij}$. The similarity value, $y_{ij}$, can have a range, such as greater than 0 to 1. The similarity value can be approximated by considering co-acquisitions between the input query and the candidate query. In some embodiments, training data can be denoted as shown in Table 1 below where $C_i$ is the set of candidate queries that are close to the input query, $q_i$.

TABLE 1

$$T = \{(q_i, c_{ij}, y_{ij})\}_{i \in \{1, 2, \ldots, |C_i|\}}^N$$

In some embodiments, the similarity value, $y_{ij}$, can be calculated based on two types of similarity for queries, such as, an (i) overlap similarity, OS, and a jaccard similarity, JS. Overlap similarity, OS, can also be referred to as an overlap coefficient and/or a similarity measure. Overlap similarity, OS, can measure the overlap between two sets. Overlap similarity, OS, can be the size of the intersection between the two sets divided by the smaller of the size of the two sets, as shown in Table 2. In the equation in Table 2, N denotes the unique acquired items from the query.

TABLE 2

$$OS = \frac{|N(q_i) \cap N(c_{ij})|}{\min(|N(q_i)|, |N(c_{ij})|)}$$

Jaccard similarity, JS, can also be referred to as a Jaccard similarity coefficient and/or Jaccard index. Jaccard similarity, JS, can gauge the similarity and diversity of sets. Jaccard similarity, JS, can be the size of the intersection divided by the size of the union of the sets, as shown in Table 3. The use of Jaccard similarity, JS, can advantageously prevent popular queries from dominating every query's candidate query list. A popular query can be a query that has many acquisitions of different items. For example, a "running shoes" query can be a popular query that is associated with many different item acquisitions.

TABLE 3

$$JS = \frac{|N(q_i) \cap N(c_{ij})|}{|N(q_i) \cup N(c_{ij})|}$$

A combination of overlap similarity, OS, and Jaccard similarity, JS, can be used for training labels. In some embodiments, the similarity value of two queries can be based on multiplying overlap similarity, OS, and Jaccard similarity, JS, as shown in Table 4. The similarity value, $y_{ij}$, can be close to 1 when the input query, $q_i$, and the candidate query, $c_{ij}$, are associated with a sufficient threshold of co-acquired items relative to other candidate queries. The labels (the similarity values) can be used to create a model to fit on the input query, the candidate query, and the similarity value ($q_i$, $c_{ij}$, $y_{ij}$) to score the similarity of the queries.

TABLE 4

QuerySimilarity = OS($q_i$, $c_{ij}$) * JS($q_i$, $c_{ij}$)

Figure 3:
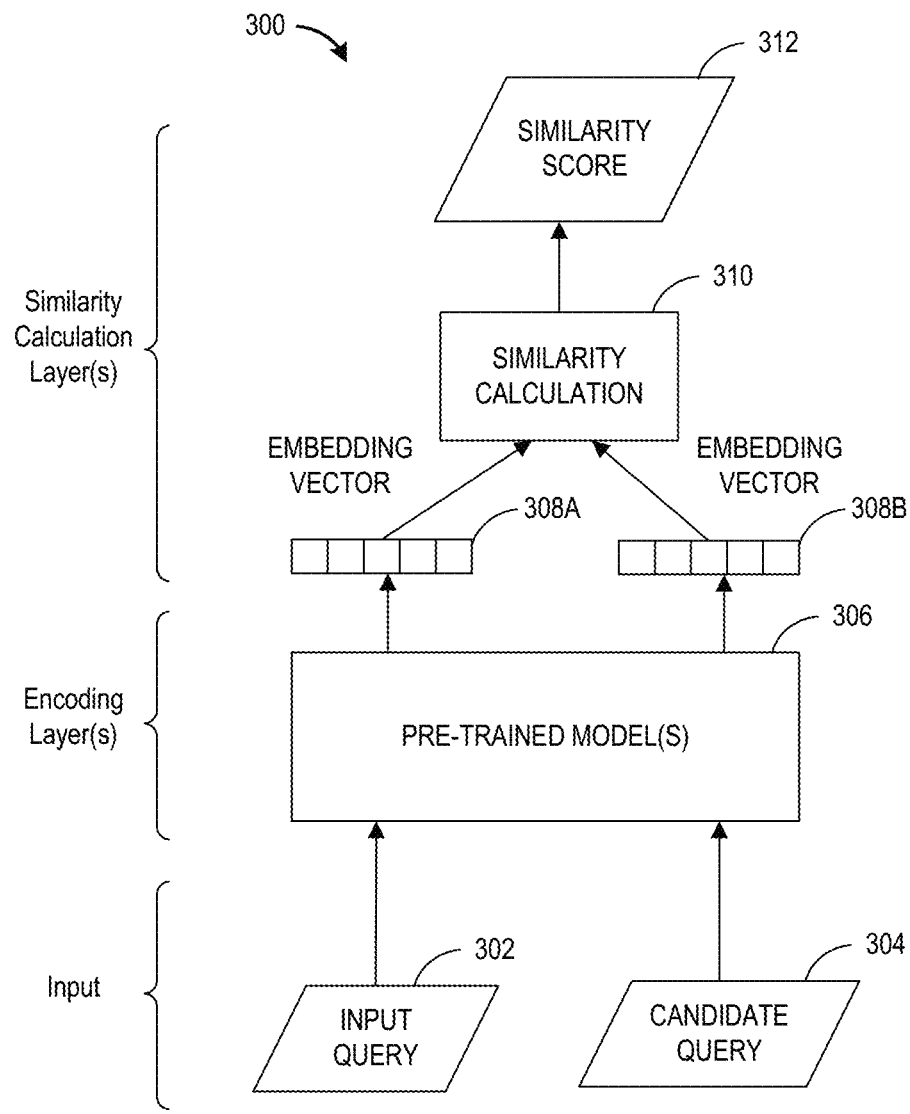
FIG. 3 depicts a methodology for determining a similarity score for two queries.

FIG. 3 depicts a methodology 300 for determining a similarity score between queries. As described herein, a similarity score between queries can be used to train machine learning models to determine similar queries. The methodology can include three components: (1) input, (2) encoding layer(s), and (3) similarity calculation layer(s). The input can include an input query 302 and a candidate query 304. In some embodiments, the input and candidate queries 302, 304 can be selected to meet certain criteria, such as, but not limited to, the queries 302, 304 being associated with the multiple instances of the same acquired item within a time period (such as three different common acquisitions within a year). Using certain criteria to select the query pairs 302, 304 can advantageously prevent weak query pairs from being generated.

The training service 116 can feed the input and candidate queries 302, 304 to the pre-trained model(s) 306. The pre-trained model(s) can be or include large language models. Depending on the embodiment, the training service 116 can feed the input and candidate queries 302, 304 differently to the pre-trained model(s) 306. If the pre-trained model(s) 306 are or include a bi-encoder model, the training service 116 can feed the input and candidate queries 302, 304 separately to the pre-trained model(s) 306, which output the two separate embeddings 308A, 308B. If the pre-trained model(s) 306 are or include a cross-encoder model, the training service 116 can concatenate the input and candidate queries 302, 304 (such as by using special tokens) and feed the concatenated input to the pre-trained model(s). For example, the training service 116 can generate input with the following format shown in Table 5, where <CLS> is the classification token and <SEP> separates sentences.

TABLE 5

<CLS> INPUT QUERY <SEP> CANDIDATE QUERY <SEP>

The training service 116 can receive the embeddings 308A, 308B from the pre-trained model(s) 306. The training service 116 can apply a similarity calculation 310 to the embeddings 308A, 308B. The similarity calculation 310 can output the similarity score 312. Depending on the embodiment, a different similarity calculation 310 can be performed. The similarity calculation 310 can include a cosine similarity function, a multi-layer perceptron, or a combination including the cosine similarity function and the multi-layer perceptron. For example, the embeddings can (i) feed into the multi-layer perceptron and a cosine similarity function and (ii) the output of the cosine similarity function can also feed into the same multi-layer perceptron.

In embodiments where the pre-trained model(s) 306 are or include a bi-encoder model, the bi-encoder model can be a class of models referred to as a representation-based model, such as, but not limited to a neural network encoder. The representation-based model can receive a query as input and output a feature embedding vector, which can be performed on the input query 302 and the candidate query 304. The training service 116 can feed the generated embeddings of the two queries into a dot product and/or perceptron to calculate the similarity score 312. In some embodiments, bi-encoder/representation-based models can have low inference costs that when deployed advantageously have low latency performance.

In embodiments where the pre-trained model(s) 306 are or include a cross-encoder model, the pre-trained model(s) 306 and the similarity calculation 310 can be an interaction-based model. A cross-encoder model can have multiple inputs and can advantageously allow informational interactions at a relatively early stage by leveraging their attention heads to exploit inter-query interactions. In some embodiments, the training service 116 can feed two connected feature embeddings into a multi-layer perceptron and/or leverage an attention mechanism between the two input queries to calculate the similarity score 312.

Figure 4A:
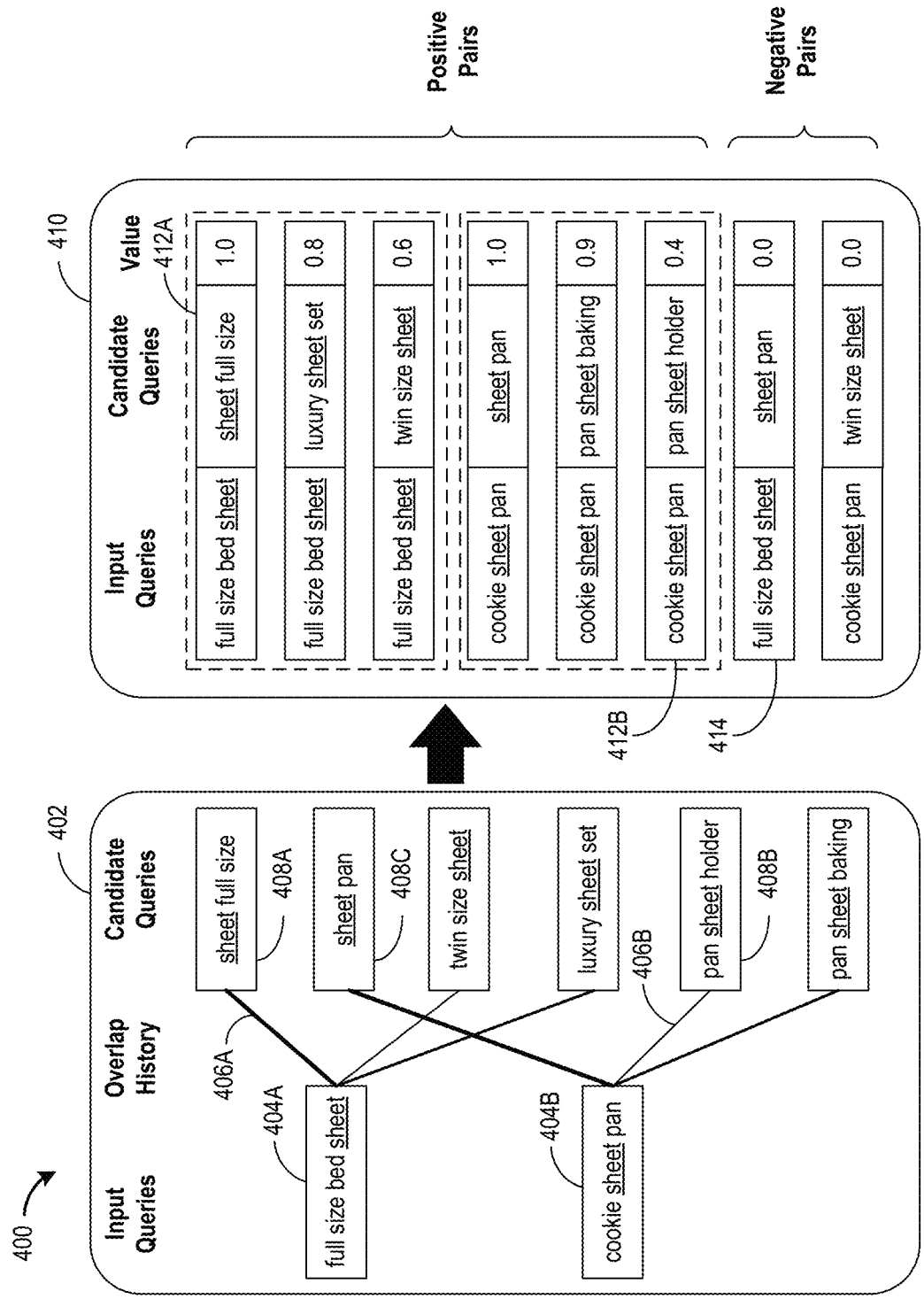

FIGS. 4A-4B depict illustrative methodology for generating training data that includes query pairs and similarity values. FIG. 4A depicts a methodology 400 where item-related data 402 is transformed into the query-pairs data 410. As shown, the item-related data 402 can include the input queries 404A, 404B, overlap history 406A, 406B, and candidate queries 408A, 408B. In particular, the first input query 404A is "full size bed sheet" and the second input query 404B is "cookie sheet pan". The overlap history 406A, 406B shown as lines can indicate that (i) the first input query 404A has common item acquisitions with three candidate queries and (ii) the second input query 404B has different, common item acquisitions with three other candidate queries. As shown, the thicker line for the first overlap history 406A between the first input query 404A (here "full size bed sheet") and a first candidate query 408A (here "sheet full size") can represent that there are relatively more common acquisitions than the thinner line for the second overlap history 406B between the second input query 404B (here "cookie sheet pan") and a second candidate query (here "pan sheet holder"). The item-related data 402 shown in FIG. 4A can illustrate how common lexical queries (such as the queries with the word "sheet" shown in underline) can have different similarities with other queries that can be determined from the common acquisitions between queries (which can distinguish between bed sheet type queries and sheet pan type queries).

The training service 116 can generate the query-pairs data 410 from the item-related data 402. As shown, the training service 116 can generate positive pairs and negative pairs from the item-related data 402. The training service 116 can generate positive pairs where queries that have common acquisitions. The training service 116 can generate negative pairs from randomly or pseudo randomly pairing queries that do not share a common acquisition history. The training service 116 can generate a first similarity value (here 1.0) for a first query pair 412A (here "full size bed sheet" and "sheet full size"). Similarly, the training service 116 can generate a second similarity value (here 0.4) for a second query pair 412B (here "cookie sheet pan" and "pan sheet holder"). The first similarity value (here 1.0) can be higher than the second similarity value (here 0.4) at least because the first query pair 412A can have relatively more common acquisitions than the second query pair 412B. As shown, a negative pair 414 (here "full size bed sheet" and "sheet pan") can be assigned a zero similarity value since the first input query 404A and a particular candidate query 408C do not have any common acquisitions.

FIG. 4B depicts training data 420 in a table format that includes query pairs and similarity values. A first data entry 422 in the training data 420 includes a first input query (here "goya lady fingers") and a first candidate query (here "lady fingers for tiramisu"). The first data entry 422 further includes item-related data, such as, the size of the intersection between the sets of acquired items between the first input query and the first candidate query (here 9), the size of the union of the sets of acquired items between the first input query and the first candidate query (here 42), and the smaller of the size of the sets of acquired items between the first input query and the first candidate query (here 12). The training service 116 can generate similarity values (such as the Jaccard similarity, overlap similarity, and a similarity value) from the item-related data. In the first data entry 422, training service 116 can calculate: the Jaccard similarity (here 0.214) from the size of the intersection (here 9) divided by the size of the union of the sets (here 42); the overlap similarity (here 0.75) from the size of the intersection between the two sets (here 9) divided by the smaller of the size of the two sets (here 12); and the similarity value (here 0.161) by multiplying the Jaccard similarity (here 0.214) and the overlap similarity (here 0.75).

The training data 420 can represent candidate queries that have similar acquisition history with an input query, here "goya lady fingers." Lady finger is a type of sponge cake biscuit and Goya® is a brand name. In the training data, the top-ranked candidate queries can include the "lady fingers for tiramisu" candidate query. It is not straightforward to automatically determine that "tiramisu" queries are similar to a "goya lady finger" query at a lexical level. However, the behavioral signals in the item-related data can indicate that queries share similar acquired items, which can be used to teach models to learn the semantic level similarity.

As described herein, the training service 116 can use the training data to train one or more machine learning models, such as, but not limited to, representation-based models and/or interaction-based models. The training service 116 can use the similarity values, $y_{ij}$, as training labels. The similarity value, $y_{ij}$, can have a range, such as greater than 0 to 1, when the input query, $q_i$, and the candidate query, $c_{ij}$, have co-acquired items. The similarity value, $y_{ij}$, can be assigned a 0 value when the input query, $q_i$, and the candidate query, $c_{ij}$, have no co-acquired items. The training service 116 can generate negative pairs ($q_i$, $c_{ij}$, 0) where there were no co-acquired items for the input query, $q_i$, and the candidate query, $c_{ij}$, and mix them with positive pairs ($q_i$, $c_{ij}$, $y_{ij}$) to train a model on the labels. During training, the training service 116 can use a loss function, such as, but not limited to, binary cross entropy (BCE) loss function and/or mean square error (MSE) loss function. A BCE loss function is shown in Table 6 below and a MSE loss function is shown below in Table 7. In the formulas of Tables 6 and 7, y is the label and $p(y_{ij})$ can be the predicted probability for the label being 1 for all N labels.

TABLE 6

$$L_{BCE} = -\frac{1}{N}\sum_{i=1}^{N} y_{ij}\log(p(y_{ij})) + (1 - y_{ij}) \cdot \log(1 - p(y_{ij}))$$

TABLE 7

$$L_{BCE} = \frac{1}{N}\sum_{i=1}^{N}(y_{ij} - p(y_{ij}))^2$$

Figure 5:
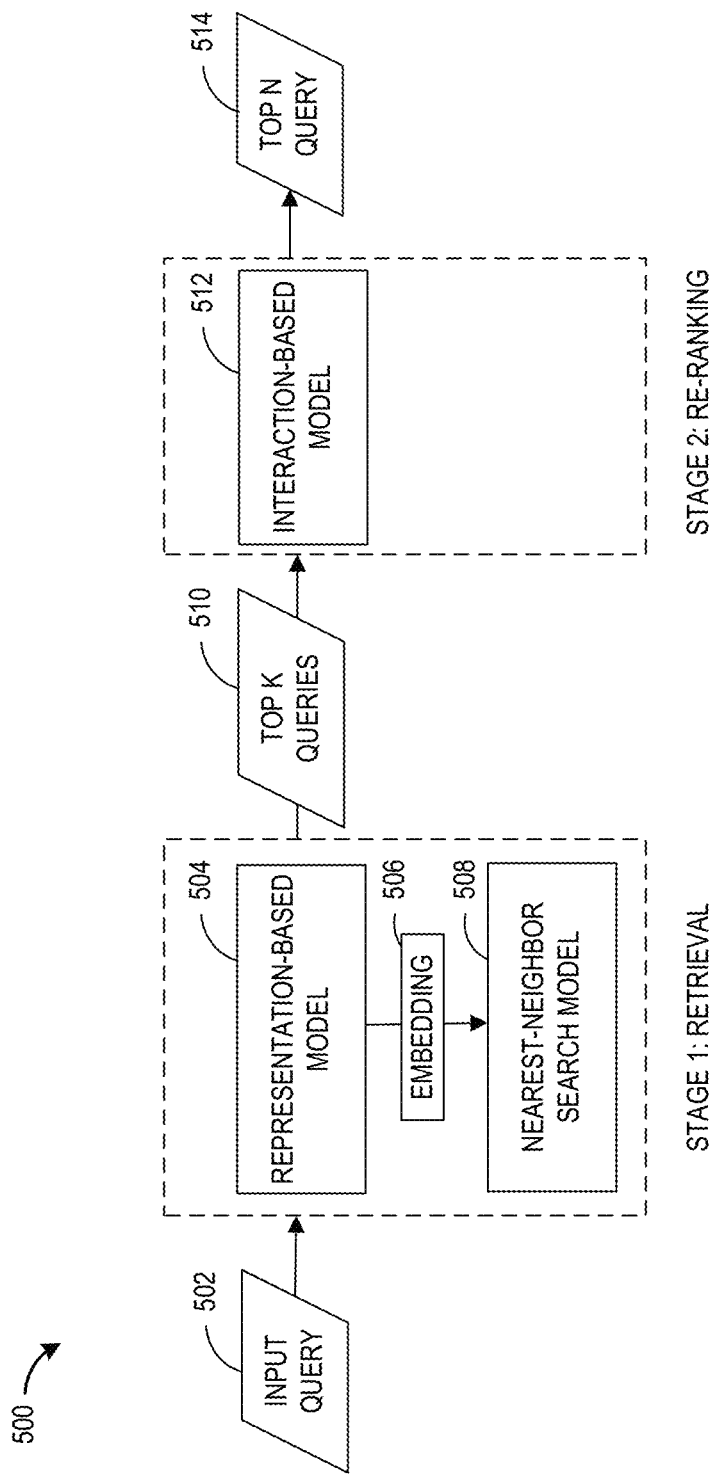
FIG. 5 depicts a methodology for predicting similar queries based on an input query.

FIG. 5 depicts a methodology 500 for predicting similar queries based on an input query 502. The methodology 500 can include a representation-based model 504, a nearest-neighbor search model 508, and an interaction-based model 512. At the first stage, a representation-based model 504 can be selected based on performance. As described herein, different pre-trained models (such as different LLMs) can be used as the representation-based model 504, evaluation metrics can be generated for each representation-based model, and a particular representation-based model 504 can be selected for use based on the evaluation metrics. Similarly, as described herein, different pre-trained models (such as different LLMs) can be used as the interaction-based model 512, evaluation metrics can be generated for each interaction-based model, and a particular interaction-based model 512 can be selected for use based on the evaluation metrics. In some embodiments, queries with sufficient behavioral signals are processed by representation-based model 504 to generate embeddings and the embeddings are added to the nearest-neighbor search model 508.

In some embodiments, the nearest-neighbor search model 508 can be or include a graph-based, nearest-neighbor search model 508. The nearest-neighbor search model 508 can make use of, but is not limited to, a PECOS Approximated Nearest Neighbor (ANN) search module that implements the Hierarchical Navigable Small World Graphs (HNSW) algorithm. The nearest-neighbor search model 508 can enable fast retrieval for large-scale vector similarity searching. The nearest-neighbor search model 508 can index the embeddings.

The inference service 110 can receive an input query 502. In the first stage, the representation-based model 504 can process the input query 502 to generate an embedding 506. The nearest-neighbor search model 508 can process the embedding 506 for the input query 502 to identify the nearest-neighbor embeddings to the embedding for the input query 502. As described herein, closeness of embeddings can be determined based on a cosine similarity, a multi-layer perceptron, or a combination including the cosine similarity and the multi-layer perceptron calculation. The first subset of queries 510 corresponding to the nearest-neighbor embeddings can be provided to the second stage for re-ranking. In the second stage, the interaction-based model 512 can process each query from the first subset of queries 510 to predict similarity to the input query 502. The inference service 110 can select a second subset of queries 514 that satisfies a threshold. In some embodiments, the inference service 110 can select those queries with a similarity score that satisfy a threshold. Additionally or alternatively, the inference service 110 can select a predetermined number of queries with a highest similarity score.

In some cases, cross-encoder/interaction-based models can outperform bi-encoder/representation-based models. However, the computational cost to execute cross-encoder/interaction-based models can be higher than the computational cost for bi-encoder/representation-based models. For example, given 100 million input queries, 100 million historical candidate queries, a cross-encoder/interaction-based model could be called $100M^2$, which could take 100 million GPU days. With a 10× inference speed and 1,000 GPUs, the predictions could take 10,000 days to finish. Accordingly, the architecture of FIG. 5, which uses faster representation-based model(s) for initial filtering and interaction-based model(s) for re-ranking can improve the operation of a computer by allowing the computer processor(s) to make faster predictions.

Figure 6:
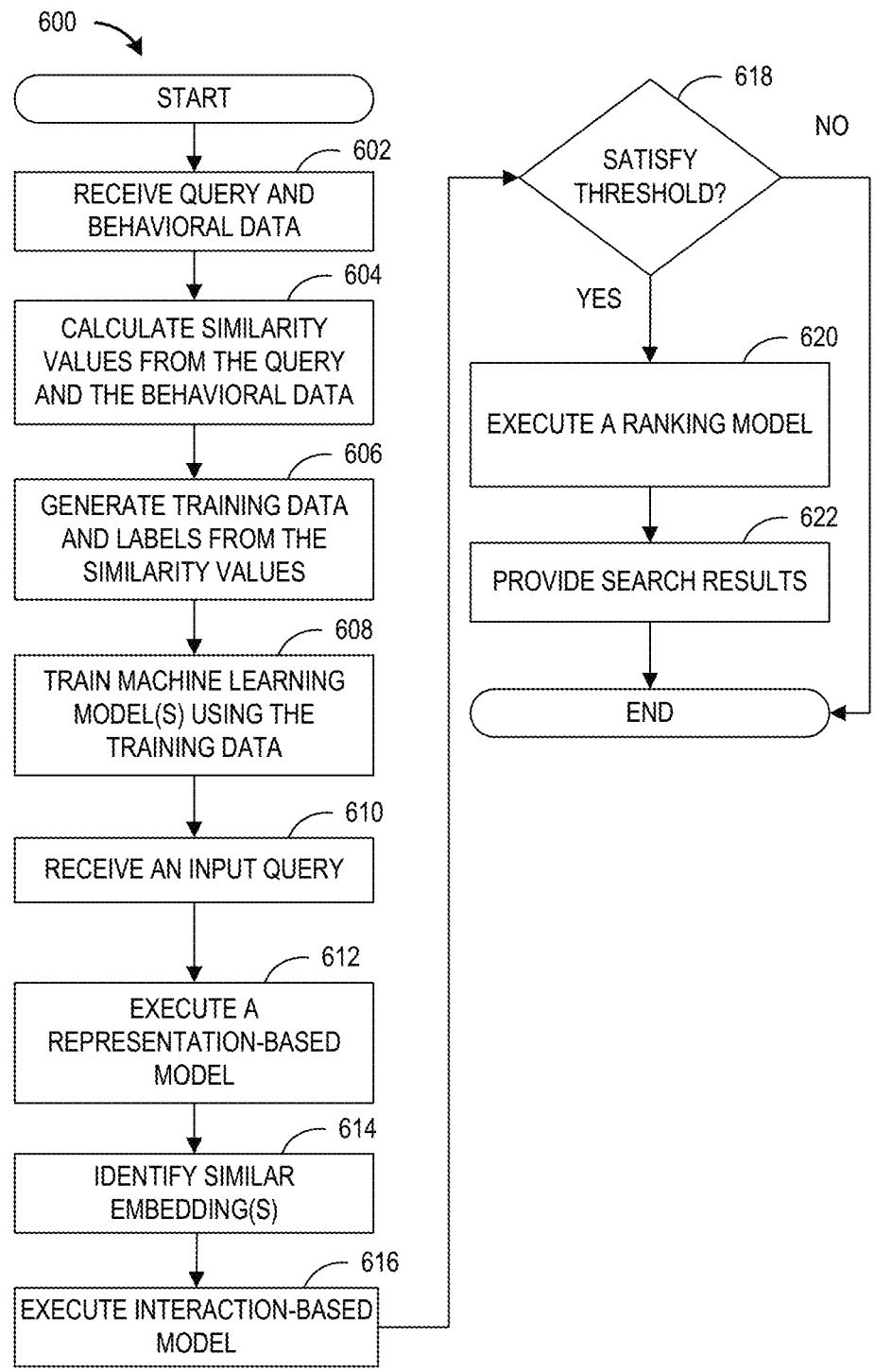
FIG. 6 is a flow chart depicting a method implemented by the search system for query-to-query prediction.

FIG. 6 includes a flow diagram depicting a method 600 implemented by the search system 104 for machine learned searching and ranking. As described herein, the search system 104 may be implemented with the computing system 201. In some embodiments, the computing system 201 may include the training application 222 and/or the inference application 224, each of which may implement aspects of the method 600. Some aspects of the method 600 may be implemented by the services of the search system 104, such as the query service 108, the ranking service 118, the training service 116, and/or the inference service 110. In some embodiments, the method 600 can be applied for inferencing and/or training purposes. Moreover, some aspects of the method 600 may be described above with respect to FIGS. 3, 4A, 4B, 5.

Beginning at block 602, query and behavioral data can be received. The search system 104 can store queries received from user computing devices 102. Each query can include text data. The search system 104 can store records of the search results for the queries and behavioral data associated with the queries. Behavioral data can include, but is not limited to, acquisitions data (such a record of acquired items associated with a query), user selections of a search result, or any other user interaction with a search result, which can be referred to as an impression.

At block 604, similarity values from the query and behavioral data can be calculated. The training service 116 can calculate similarity values from the query and behavioral data. The training service 116 can determine a quantity of co-acquired items associated with a first query and a second query, which can be referred to as a query pair. The training service 116 can determine a similarity value from the quantity of co-acquired items associated with the query pair. As described herein, the training service 116 can calculate an overlap similarity and a jaccard similarity using the quantity of co-acquired items. The training service 116 can determine a similarity value by combining the overlap similarity and the jaccard similarity. The training service 116 can determine a lack of co-acquired items for other query pairs. Additional details regarding calculating a similarity value are described herein, such as with respect to FIG. 4B and Table 4. In some embodiments, the training service 116 can calculate similarity values for queries that have sufficient behavioral data. The training service 116 can filter the queries to those that have at least a predetermined number (such as three) of co-acquired items within a timer period (such as a year). Filtering the queries can advantageously prevent weak query pairs from being generated in the training data.

As described herein, the training service 116 can calculate an overlap similarity. The training service 116 can determine a quantity of acquired items associated with the first query and a quantity of acquired items associated with the second query. The training service 116 can identify a smaller quantity of acquired items from the quantities of acquired items for the first and second queries. To calculate the overlap similarity, the training service 116 can divide the quantity of co-acquired items by the smaller quantity of acquired items. Additional details regarding calculating overlap similarity are described herein, such as with respect to FIG. 4B and Table 2.

As described herein, the training service 116 can calculate a jaccard similarity. The training service 116 can determine a first set of acquired items associated with the first query and a second set of acquired items associated with the second query. The training service 116 can determine a size of a union set between the first set and the second set. To calculate the jaccard similarity, the training service 116 can divide the quantity of co-acquired items by the size of the union set. Additional details regarding calculating jaccard similarity are described herein, such as with respect to FIG. 4B and Table 3.

At block 606, training data and labels can be generated from the similarity values. The training service 116 can generate training data that includes the queries and the similarity values as labels. The training service 116 can add query pairs and the similarity value for the query pair to the training data. The training service 116 can generate training data that includes a query pair and a similarity value as a label for the query pair. The added query pairs can be positive query pairs in that the queries have co-acquired items associated with them. The similarity value for query pairs with co-acquired items can be a positive label. The training service 116 can add query pairs that lack co-acquired items to the training data with negative labels. A negative label can include, but is not limited to, a zero value. The training service 116 can randomly or pseudo-randomly select pairs of queries without co-acquired items between them and mix them with the positive query pairs in the training data. The training service 116 can assign a zero value as a label for the negative query pairs in the training data.

At block 608, one or more machine learning models can be trained. The training service 116 can train the one or more machine learning models using supervised and/or semi-supervised machine learning. As described herein, the one or more machine learning models can be representation-based models and/or interaction-based models. The one or more machine learning models can also be or include a pre-trained model and/or a large language model. The representation-based models and/or interaction-based model can be or include a large language model. Large language models can include, but are not limited to, a bidirectional encoder representations from transformers (BERT) model, a sentence BERT model, or a generative pre-trained transformer (GPT) model. The training service 116 can train a pre-trained model with the training data, which outputs a representation-based model and/or an interaction-based model. As described herein, in the case of a representation-based model, the representation-based model can be trained to receive an input query and output a first embedding. The representation-based model can receive a candidate query and output a second embedding. The training service 116 can generate a similarity score from the first and second embeddings. As described herein, in the case of an interaction-based model, the interaction-based model can be trained to receive an input query and a candidate query and output a similarity score. The training service 116 can use the labels, a loss function, and backpropagation to update the machine learning model(s) during training, which causes weights in the machine learning model(s) to update. As described herein, the training service 116 can use loss functions such as, but not limited to, a binary cross entropy loss function and/or a mean square error loss function.

In some embodiments, the performance of a bi-encoder and/or representation-based model can be improved via transfer learning. The training service 116 can train a cross-encoder model with the training data. As described herein, a cross-encoder model can have better performance than a bi-encoder model, but at a greater computational cost. Thus, the training service 116 can use the output from a cross-encoder model to train a bi-encoder and/or a representation-based model. The training service 116 can receive output from the cross-encoder model where the output includes similarity scores. The training service 116 can a pre-trained model with the training data based on the output, which can output a representation-based model.

In some embodiments, the pre-trained model can be trained specifically for an organization. For example, the pre-trained model can be a large language model that is trained on the e-commerce data from an organization. In some cases, the custom pre-trained models can outperform third-party pre-trained models. The training service 116 can train a large language model using training data, such as organization specific training data. The training service 116 can determine a quantity of co-acquired items associated with a query pair and determine a similarity value from the quantity of co-acquired items associated with the query pair. The training service 116 can generate training data that includes (i) the query pair and (ii) the similarity value as a label for the query pair. Additional types of training data are described herein, such as with respect to the previous block 606. The training service 116 can retrain the large language model using the generated training data, which outputs the representation-based and/or the interaction-based model.

At block 610, an input query can be received. The user interface 120 can receive an input query. In some embodiments, a query service 108 can retrieve search results from the item data storage 112 based on the input query. As described herein, if the input query is associated with insufficient behavioral signals, the inference service 110 can predict similar queries with better behavioral signals.

At block 612, a representation-based model can be executed. The inference service 110 can execute a representation-based model. The inference service 110 can execute a representation-based model wherein the representation-based model receives the input query and outputs a first embedding. As described herein, the representation-based model can be trained using the similarity values as labels.

At block 614, one or more similar embeddings can be identified. The inference service 110 can identify a second embedding associated with a candidate query similar to the first embedding associated with the input query. The inference service 110 can determine similarity between embeddings using a cosine similarity calculation and/or a multilayer perceptron. In some embodiments, the inference service 110 can identify similar embeddings to the first embedding using a nearest-neighbor search model. The inference service 110 can determine a candidate query associated with the second embedding. Additional details regarding identifying similar embeddings are described herein, such as with respect to FIG. 5.

In some embodiments, the inference service 110 can identify an embedding similar to the embedding derived from the input query using a representation-based model. The inference service 110 can execute a representation-based model where the representation-based model receives the candidate query and outputs a second embedding. The inference service 110 can calculate a similarity score from the first embedding (derived with the input query) and the second embedding (derived from the candidate query). The inference service 110 can determine that the similarity score satisfies a threshold. In some embodiments, the threshold can be set higher or lower depending on the performance of the model, such as the representation-based model. If the accuracy of the representation-based model is higher, then the threshold can be set lower and vice versa.

The inference service 110 can calculate the similarity score using a cosine similarity. The inference service 110 can apply a cosine similarity function to the first embedding and the second embedding. A cosine similarity can be a measure of similarity between two non-zero vectors defined in an inner product space. Cosine similarity can be the cosine of the angle between the vectors, which can be calculated via the dot product of the vectors divided by the product of their lengths. The distance or cosine similarity between two vectors can measure whether the two queries are semantically related.

The inference service 110 can calculate the similarity score using a multilayer perceptron. The inference service 110 can apply the first embedding and the second embedding to a multilayer perceptron where the multilayer perceptron outputs the similarity score. A multilayer perceptron can refer to a fully connected feedforward neural network. A multilayer perceptron can include an input layer, a hidden layer, and an output layer. Except for the input nodes, each node can be a neuron that uses a nonlinear activation function. The multilayer perceptron can use backpropagation or reverse mode of automatic differentiation for training.

The inference service 110 can calculate the similarity score using a cosine similarity and a multilayer perceptron. The inference service 110 can apply a cosine similarity function to the first embedding and the second embedding. The cosine similarity function can output a cosine similarity value. The inference service 110 can apply the first embedding, the second embedding, and the cosine similarity value to a multilayer perceptron where the multilayer perceptron outputs the similarity score.

In some embodiments, the inference service 110 can identify an embedding similar to the embedding derived from the input query using a nearest-neighbor search model.

The inference service 110 can provide, to a nearest-neighbor search model, the first embedding as input, wherein the nearest-neighbor search model outputs the second embedding. As described herein, the nearest-neighbor search model 508 can make use of, but is not limited to, a PECOS ANN search module that implements the HNSW algorithm. Additional details regarding using a nearest-neighbor search mode are described herein, such as with respect to FIG. 5.

At block 616, an interaction-based model can be executed. The inference service 110 can execute an interaction-based model. The inference service 110 can execute an interaction-based model where the interaction-based model receives (i) the input query and (ii) the candidate query and outputs a similarity score. Additional details regarding executing machine learning models, such as an interaction-based model, are described herein, such as with respect to FIG. 5.

At block 618, it can be determined whether the similarity score satisfies a threshold. The inference service 110 can determine whether the similarity score satisfies a threshold, such as by selecting a predetermined number of candidate queries with the highest similarity scores. Additionally or alternatively, the inference service 110 can determine whether the similarity score is above a threshold value. As described herein, the threshold can be set higher or lower depending on the performance of the model, such as the interaction-based model. If the accuracy of the interaction-based model is higher, then the threshold can be set lower and vice versa. If the similarity score satisfies the threshold, the method 600 proceeds to block 620 to execute a ranking model. Otherwise, the method 600 can end since the candidate query is not similar enough to the input query. In some embodiments, a block (not illustrated) similar to block 618 can be performed after the previous block 614 for identifying similar embeddings. For example, the inference service 110 can filter out candidate queries with lower similarity scores before they are processed by the block 616 for executing an interaction-based model.

At block 620, a ranking model can be executed. The query service 108 can retrieve search results associated with the one or more candidate queries. The ranking service 118 can execute a ranking model. The ranking service 118 can generate ranking features for the input query and a search result using a behavioral signal for the candidate query. The ranking service 118 can advantageously improve search ranking by augmenting queries where behavioral signals are sparse with prior scores. The ranking service 118 can execute a ranking model where the ranking model receives the ranking features and outputs a predicted ranking. In some embodiments, the ranking model can receive two ranking features and output a predicted ranking for two search results. The ranking service 118 can apply an algorithm ranking pairs of search results to determine a ranking for a set of search results. In other embodiments, the ranking model can receive a list ranking features and output a predicted ranking for the list of search results. In some embodiments, the ranking model can be or include a tree-based ranking model.

The ranking service 118 can generate ranking features based on multiple candidate queries. As described herein, the inference service 110 can identify multiple candidate queries similar to the input query. The ranking service 118 can generate the ranking feature for the input query and the search result based on the multiple candidate queries. For each candidate query from the multiple candidate queries, the ranking service 118 can combine a behavioral signal for the candidate query and the first search result. As described herein, for a given input query, q, the method 600 can find the query's similar queries, $C_q = \{c_1, \ldots, c_m\}$, based on similar behavioral signals. The ranking service 118 can generate a prior for the input query using behavioral signals from the similar queries. For the input query, q, and a related search result, r, H(q,r) is used to represent the behavioral signal score. The equation in Table 8 below represents how the ranking service 118 can combine a behavioral signal for each candidate query for a prior for the input query and the search result, Prior(q,r).

TABLE 8

$$\text{Prior}(q, r) = \frac{1}{|C_q|} \sum_{i \in [1,m]} H(c_i, r)$$

The ranking service 118 can generate the ranking feature by combining the prior, Prior(q,r), with the behavioral signal score, H(q,r). The equation in Table 9 below represents how the ranking service 118 can calculate the ranking feature, F(q,p).

TABLE 9

$$F(q, p) = \alpha \cdot H(q, r) + (1 - \alpha) \cdot \text{Prior}(q, r) \cdot \beta$$

In the equation of Table 9, a can be defined in Table 10 below and the ranking service 118 can compute a from query-result impressions. The greater the query-result impressions, the higher a can be in the equation of Table 9, which can be used to balance the weight between observed behavioral signals and prior scores. In the equation of Table 10, $I_{q,r}$ can denote the number of impressions result, r, for the input query, q, and $\gamma$ can be a constant to cap very large numbers. In the equation of Table 9, R can be the confidence rate to further adjust the weight of the prior.

TABLE 10

$$\alpha = \tanh\left[\frac{\min(\gamma, I_{q,r})}{\min(\gamma, \max_r(I_{q,r}))}\right]$$

At block 622, search results can be provided. The ranking service 118 can provide the search results. In some embodiments, the user interface 120 can cause presentation of the search result according to the predicted ranking. The user interface 120 can be a graphical user interface.

While the systems and methods described herein are discussed on the context of providing search results they can also be applied to other contexts. Additional contexts, can include, but are not limited to, inline search recommendation, recommending related items to users, and/or adding links to a knowledge graph. Also, the systems and methods described herein can also natively support other languages. For example, the machine learning algorithms described herein can process input queries and/or identify similar queries in multiple languages and/or languages other than English.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied. The term "substantially" when used in conjunction with the term "real time" can refer to speeds in which no or little delay occurs.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a data storage medium to store computer-executable instructions; and
   a computer hardware processor in communication with the data storage medium, wherein the computer hardware processor executes the computer-executable instructions to at least:
   receive an input query;
   execute a representation-based model, wherein the representation-based model receives the input query and outputs a first embedding;
   identify a second embedding similar to the first embedding;
   determine a candidate query associated with the second embedding;
   execute an interaction-based model, wherein the interaction-based model receives (i) the input query and (ii) the candidate query, and outputs a similarity score;
   determine that the similarity score satisfies a threshold;
   generate, from a behavioral signal for the candidate query, a ranking feature for the input query and a search result;
   execute a ranking model, wherein the ranking model receives the ranking feature and outputs a predicted ranking; and cause presentation, in a graphical user interface, of the search result according to the predicted ranking.

2. The system of claim 1, wherein the computer hardware processor executes further computer-executable instructions to at least:
- determine a first quantity of co-acquired items associated with a first query and a second query;
- calculate an overlap similarity from the first quantity of co-acquired items;
- calculate a jaccard similarity from the first quantity of co-acquired items;
- determine a similarity value, wherein to determine the similarity value, the computer hardware processor executes the further computer-executable instructions to at least combine the overlap similarity and the jaccard similarity;
- generate training data comprising: the first query, the second query, and the similarity value as a label; and
- train a pre-trained model with the training data, wherein to train the pre-trained model, the computer hardware processor executes the further computer-executable instructions to at least output the representation-based model.

3. The system of claim 2, wherein the computer hardware processor executes further computer-executable instructions to at least:
- determine a second quantity of acquired items associated with the first query;
- determine a third quantity of acquired items associated with the second query; and
- identify a smaller quantity of acquired items between the second quantity of acquired items and the third quantity of acquired items,
- wherein to calculate the overlap similarity, the computer hardware processor executes additional computer-executable instructions to at least divide the first quantity of co-acquired items by the smaller quantity of acquired items.

4. The system of claim 2, wherein the computer hardware processor executes further computer-executable instructions to at least:
- determine a first set of acquired items associated with the first query;
- determine a second set of acquired items associated with the second query; and
- identify a size of a union set between the first set and the second set,
- wherein to calculate the jaccard similarity, the computer hardware processor executes additional computer-executable instructions to at least divide the first quantity of co-acquired items by the size of the union set.

5. The system of claim 1, wherein the representation-based model comprises a bidirectional encoder representations from transformers (BERT) model.

6. The system of claim 1, wherein the interaction-based model comprises a cross-encoder model.

7. A computer-implemented method comprising:
- receiving an input query;
- executing a representation-based model, wherein the representation-based model receives the input query and outputs a first embedding;
- identifying a second embedding similar to the first embedding;
- determining a candidate query associated with the second embedding;
- executing an interaction-based model, wherein the interaction-based model receives (i) the input query and (ii) the candidate query, and outputs a first similarity score;
- determining that the first similarity score satisfies a first threshold;
- generating, from a behavioral signal for the candidate query, a ranking feature for the input query and a first search result;
- executing a ranking model, wherein the ranking model receives the ranking feature and outputs a predicted ranking; and
- providing, to a computing device, a plurality of search results according to the predicted ranking, wherein the plurality of search results comprise the first search result.

8. The computer-implemented method of claim 7, wherein identifying the second embedding similar to the first embedding comprises:
- executing the representation-based model, wherein the representation-based model receives the candidate query and outputs a second embedding;
- calculating a second similarity score from the first embedding and the second embedding; and
- determining that the second similarity score satisfies a second threshold.

9. The computer-implemented method of claim 8, wherein calculating the second similarity score from the first embedding and the second embedding comprises applying a cosine similarity function to the first embedding and the second embedding.

10. The computer-implemented method of claim 8, wherein calculating the second similarity score from the first embedding and the second embedding comprises applying the first embedding and the second embedding to a multilayer perceptron, wherein the multilayer perceptron outputs the second similarity score.

11. The computer-implemented method of claim 7 further comprising:
- identifying a plurality of candidate queries similar to the input query,
- wherein generating the ranking feature for the input query and the first search result comprises for each candidate query from the plurality of candidate queries, combining a behavioral signal for the candidate query and the first search result.

12. The computer-implemented method of claim 7 further comprising:
- determining a quantity of co-acquired items associated with a first query pair;
- determining a similarity value from the quantity of co-acquired items associated with the first query pair;
- determining a lack of co-acquired items for a second query pair;
- generate training data comprising: the first query pair, the similarity value as a positive label for the first query pair, the second query pair, and a negative label for the second query pair; and
- training a pre-trained model with the training data, wherein training the pre-trained model comprises outputting the representation-based model.

13. The computer-implemented method of claim 7, wherein at least one of the representation-based model or the interaction-based model comprises a large language model.

14. A system comprising:
  a data storage medium to store computer-executable instructions; and
  a computer hardware processor in communication with the data storage medium, wherein the computer hardware processor executes the computer-executable instructions to at least:
    receive an input query;
    execute a representation-based model, wherein the representation-based model receives the input query and outputs a first embedding;
    identify a second embedding similar to the first embedding;
    determine a candidate query associated with the second embedding;
    execute an interaction-based model, wherein the interaction-based model receives (i) the input query and (ii) the candidate query, and outputs a first similarity score;
    determine that the first similarity score satisfies a first threshold; and
    provide, to a computing device, a search result associated with the candidate query.

15. The system of claim 14, wherein the computer hardware processor executes further computer-executable instructions to at least:
  determine a quantity of co-acquired items associated with a query pair;
  determine a similarity value from the quantity of co-acquired items associated with the query pair;
  generate first training data comprising: (i) the query pair and (ii) the similarity value as a label for the query pair;
  train a cross-encoder model with the first training data;
  receive output from the cross-encoder model, wherein the output comprises a plurality of similarity scores;
  generate second training data comprising the plurality of similarity scores; and
  train a pre-trained model with the second training data, wherein to train the pre-trained model comprises, the computer hardware processor executes further computer-executable instructions to at least output the representation-based model.

16. The system of claim 14, wherein to identify the second embedding similar to the first embedding, the computer hardware processor executes further computer-executable instructions to at least provide, to a nearest-neighbor search model, the first embedding as input, wherein the nearest-neighbor search model outputs the second embedding.

17. The system of claim 14, wherein the computer hardware processor executes further computer-executable instructions to at least:
  determine a quantity of co-acquired items associated with a query pair;
  determine a similarity value from the quantity of co-acquired items associated with the query pair;
  generate training data comprising: (i) the query pair and (ii) the similarity value as a label for the query pair; and
  train a pre-trained model with the training data, wherein to train the pre-trained model comprises, the computer hardware processor executes further computer-executable instructions to at least output the interaction-based model.

18. The system of claim 14, wherein to identify the second embedding similar to the first embedding, the computer hardware processor executes further computer-executable instructions to at least:
  execute the representation-based model, wherein the representation-based model receives the candidate query and outputs a second embedding;
  calculate a second similarity score from the first embedding and the second embedding; and
  determine that the second similarity score satisfies a second threshold.

19. The system of claim 18, wherein to calculate the second similarity score from the first embedding and the second embedding, the computer hardware processor executes additional computer-executable instructions to at least:
  apply a cosine similarity function to the first embedding and the second embedding, wherein the cosine similarity function outputs a cosine similarity value; and
  applying the first embedding, the second embedding, and the cosine similarity value to a multilayer perceptron, wherein the multilayer perceptron outputs the second similarity score.

20. The system of claim 14, wherein the computer hardware processor executes further computer-executable instructions to at least:
  train a large language model with first training data;
  determine a quantity of co-acquired items associated with a query pair;
  determine a similarity value from the quantity of co-acquired items associated with the query pair;
  generate second training data comprising: (i) the query pair and (ii) the similarity value as a label for the query pair; and
  retrain the large language model with the second training data, wherein to retrain the large language model, the computer hardware processor executes further computer-executable instructions to at least output the representation-based model.

* * * * *